United States Patent [19]

Schmall

[11] Patent Number: 4,682,004

[45] Date of Patent: Jul. 21, 1987

[54] MEASURING ARRANGEMENT HAVING A CAPACITIVE MEASURING ELECTRODE AND A WORKING TOOL WITH INTEGRATED ELECTRODE

[75] Inventor: Karl-Heinz Schmall, Baden-Baden, Fed. Rep. of Germany

[73] Assignee: GET Gesellschaft fur Elektronik-Technologie mbH, Baden-Baden, Fed. Rep. of Germany

[21] Appl. No.: 825,144

[22] Filed: Feb. 3, 1986

[30] Foreign Application Priority Data

Feb. 8, 1985 [CH] Switzerland ............................ 581/85

[51] Int. Cl.⁴ .............................................. B23K 15/00
[52] U.S. Cl. ........................ 219/121 PC; 219/124.02; 219/121 PT; 219/121 PV; 318/632; 318/662; 33/125 T; 266/76
[58] Field of Search ................... 219/121 PV, 121 PT, 219/121 PU, 124.02; 33/125 R, 125 T; 318/662, 632, 676, 606, 607; 266/76

[56] References Cited

U.S. PATENT DOCUMENTS

| | | | |
|---|---|---|---|
| 3,809,308 | 5/1974 | Roeder et al. | 219/124.02 |
| 4,101,754 | 7/1978 | Fischer | 219/121 PV |
| 4,298,784 | 11/1981 | Schmall | 318/662 |
| 4,300,226 | 11/1981 | Barnette et al. | 318/662 |
| 4,463,298 | 7/1984 | Halbauer | 219/124.02 |

Primary Examiner—M. H. Paschall
Attorney, Agent, or Firm—William R. Hinds

[57] ABSTRACT

In a measuring arrangement for measuring or regulating spacing on thermal working machines (for example, flame cutting installations), two capacitive electrodes are arranged at different spacings from the workpiece. Interference signals can result from changes in the dielectric constant between the electrodes and the workpiece during the thermal working operation. The output signals of the two electrodes are in negative feedback relationship for compensation purposes.

12 Claims, 9 Drawing Figures

MEASURING ARRANGEMENT HAVING A CAPACITIVE MEASURING ELECTRODE AND A WORKING TOOL WITH INTEGRATED ELECTRODE

FIELD OF THE INVENTION

The invention relates to a measuring arrangement having a capacitive measuring electrode for the contactless measurement of the spacing between a metal workpiece and a thermal working tool by means of which material is melted, burnt or vaporised, in particular for the purposes of welding, flame cutting or plasma cutting, wherein the measuring electrode is disposed in the region in which heat is developed by the tool.

DESCRIPTION OF PRIOR ART

A very wide range of designs in respect of such measuring arrangements is known and conventional practice and is disclosed for example in the present assignee's following prior publications: DE-OS Nos. 27 26 648, 3 28 29 851, 27 47 539 and Swiss patent specification No. 641,989.

Such measuring arrangements are used for a very wide range of thermal working processes. Such processes include in particular welding and cutting processes of a very wide range of kinds, with energy being supplied for example by gas (flame, burning or welding processes), electrical current (plasma process) and also laser beams.

As is known, such measuring arrangements are based on the consideration that the capacitance as between a measuring electrode and the workpiece to be worked upon is used as a basis for producing signals which correspond to the spacing. More specifically, the capacitance is directly dependent on the capacitance as between the electrode and the workpiece.

The capacitance is calculated from the following formula:

$$C = 0.0884 \times \frac{A \times \epsilon}{a} \; [pF]$$

in which:
C = Capacitance [pF/pico farad]
A = Effective area of the electrode [cm$^2$]
a = Electrode-workpiece spacing
$\epsilon$ = Dielectric constant (epsilon)

It will be seen that, with the electrode area A preset by virture of design considerations, the capacitance value is dependent both on the electrode-workpiece spacing and also the dielectric constant.

Now, in relation to thermal working tools, it may happen that the dielectric constant alters during the working operation. That occurs, for example, if the air is ionised or if clouds of metal vapor are formed between the workpiece and an electrode. Such alterations in the dielectric constant (which, in spite of the spacing a being the same, result in a change in capacitance) give rise to measuring errors in regard to determining the spacing and/or unstable control of the spacing.

SUMMARY OF THE INVENTION

The invention is based on the object of providing a measuring arrangement and a working tool, which eliminate such disturbances to the maximum possible extent and which make it possible to compensate for the alterations in the dielectric constant.

According to the invention that is primarily achieved in that a compensation electrode is also disposed in the region in which heat is developed by the tool in a form or at a spacing from the workpiece such that the spacing-dependent capacitance thereof relative to the workpiece is different from that of the measuring electrode, in particular that the spacing thereof relative to the workpiece is larger, and that the spacing signals derived from the compensation electrode are attenuated or amplified in a suitable manner and put into negative feedback relationship with the measuring signals derived from the measuring electrode.

Any alteration in the dielectric constant, for example, due to ionisation or metal vapors, evidently causes a change in the capacitance both of the measuring electrode ad also of the compensation electrode. However, those interference signals are compensated for by the negative feedback relationship. On the other hand, a change in the spacing between the two electrodes and the workpiece has a substantially greater effect, in regard to a change in capacitance, in the case of the measuring electrode than in the case of the compensation electrode, as the spacing-dependent capacitance thereof, reative to the workpiece, is different from and preferably smaller than that between the measuring electrode and the workpiece. While therfore the arrangement according to the invention provides for compensation for disturbances due to alterations in the dielectric constant, a change in spacing can be readily ascertained and monitored.

In practice the invention may be carried into effect in a particularly simple manner if the compensation electrode and the measuring electrode are each in the form of a frequency-influencing member of a respective LC-circuit, if a respective arrangement for converting the changes in frequency into d.c. measuring signals and d.c. compensation signals is supplied with the output signals of the LC-circuits, and if there is provided an arrangement for negative feedback of the d.c. signals. Such an arrangement is particularly insensitive to interference voltage influences or charges in the electrode region because the change in the electrode capacitances is converted into changes in frequency, thereby providing for signal processing which is independent of interference voltages. The circuit for converting the changes in frequency into d.c. measuring signals as well as the arrangement for providing negative feedback in respect of the d.c. signals may be easily disposed at a spacing from the tool and thus can be screened from interference voltage influences. Particularly good results may be achieved with that configuration if the LC-circuit (which includs the compensation electrode and the measuring electrode respectively) is the frequency-determining component of a respective oscillator. In that connection, the two circuits may be reliably separated from each other by virtue of the choice of oscillator frequencies while, after the changes in frequency are converted into d.c. signals, preferably by means of a discriminator, the desired negative feedback effect and the effect of compensating for disturbances can be easily effected by connecting the outputs of the two discriminators in opposite relationship to each other.

For certain situations of use, it is also sufficient to have a bridge circuit in the measuring arrangement, in which case the compensation electrode and the measuring electrode are advantageously disposed in mutually opposite arms of a bridge circuit in such a way as to compensate for similar fluctuations in capacitance, in the bridge circuit. Such a circuit can be constructed at a somewhat lower level of expenditure in terms of components, but the effect of interference voltages may be greater than in the case of the above-described measuring arrangement with oscillator and LC-circuit.

It is possible to provide for fluctuations in the dielectric constants having a particularly uniform effect on the measuring electrode and the compensation electrode if the measuring electrode and the compensation electrode surround the tool in an annular configuration and if the outside diameter of the compensation electrode is larger than the outside diameter of the measuring electrode.

If the fluctuations in the dielectric constant are caused in particular by virtue of the fact that metal vapors rise up during the working operation, the compensation electrode may also be in the form of a cylinder which is disposed around the working tool so that the rising metal vapors pass into the annular space between the compensation electrode and the tool and alter the capacitance between the tool and the compensation electrode in the same manner as the capacitance between the measuring electrode and the tool.

In the case of working operations in which metal sprays against the tool, as occurs in particular for example when starting up flame cutting installations, it is advantageous for the compensation electrode and the measuring electrode to be arranged in an apertured disclike configuration around the tool, wherein the disc surfaces extend away from the tool at an angle of less than 90° relative to the longitudinal axis of the tool. That arrangement makes it possible to provide that such metal particles and also clouds of gas can escape unimpededly and as quickly as possible from the region between the electrodes and the tool, without contaminating the electrodes and affecting the capacitance thereof. In that respect particularly advantageous results are achieved if the angle of the disc surface, at the side which is towards the workpiece, is between 75° and 45°.

A working tool with integrated electrode has proved successful in particular in relation to plasma cutting equipment, wherein the tool is provided at its end towards the workpiece with a terminal portion or member of frustoconical configuration, the terminal member being insulated relative to the tool and/or the tool insulated relative to earth and disposed with a low capacitance so that the terminal member of the tool itself is formed as the measuring electrode. In that case the compensation electrode may be disposed annularly around the terminal member. The terminal member is advantageously fixed to the tool by means of an insulating intermediate portion so that suitable dimensioning provides a low capacitance as between the terminal member and the tool. The insulating intermediate portion may advantageously be formed as a ceramic portion.

The inventive content of the subject-matter of this application is afforded both by the novel individual features and also in particular by combination and subcombination of all features employed.

DESCRIPTION OF DRAWINGS

The invention is described in greater detail hereinafter by means of embodiments with reference to the drawings, in which.

DESCRIPTION OF PREFERRED EMBODIMENTS

Figure 1:
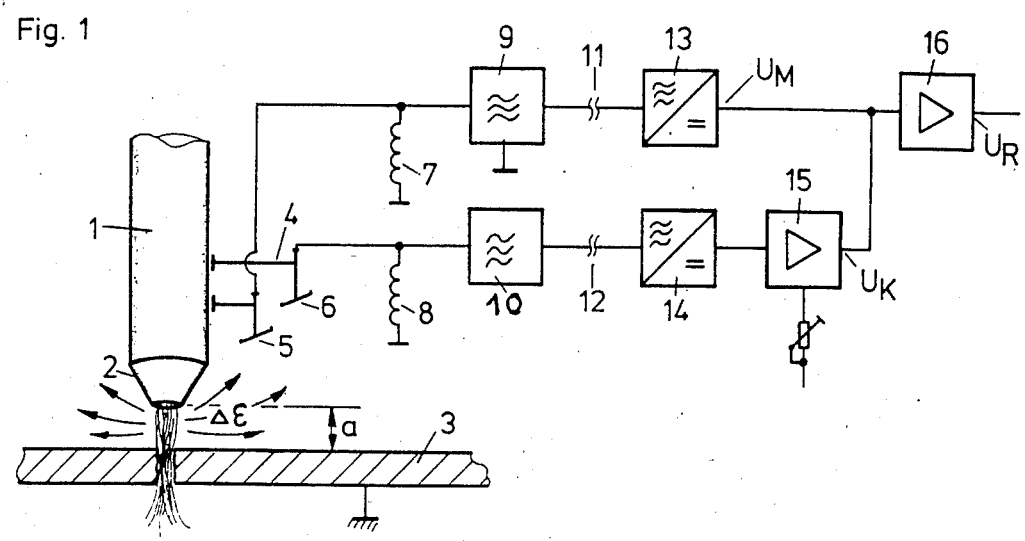
FIG. 1 is a diagrammatic view of a measuring arrangement having the features of the invention.

Referring to FIG. 1, shown therein as the working tool 1 is the torch nozzle 2 of an automatic flame cutting installation (not shown). The nozzle 2 is moved by an automatic feed means over a workpiece 3 which is a steel plate that is to be cut. The workpiece 3 is earthed. A measuring electrode 5 and a compensation electrode 6 are secured to the nozzle 2 by means of holders 4 of insulating material. The capacitance between the workpiece 2 and the electrodes 5 and 6 is both determined by the spacing between the nozzle 2 and the workpiece 3 and also influenced by changes in the dielectric constant "$\Delta\epsilon$" of the medium between the electrodes 5 and 6 and the workpiece 3. During the working operation metal vapors and metal particles may come away from the workpiece 3 and pass into the space between the electrodes 5 and 6 and the workpiece 3. That causes a change in the dielectric constant and thus an alteration in the value of the capacitance between the electrodes 5 and 6 and the workpiece 3.

The electrodes 5 and 6 are each a part of respective LC-circuits having coils 7 and 8. The LC-circuits 5, 7 and 6, 8 are connected in the form of frequency-determining components to the oscillators 9 and 10. Any change in spacing between the electrodes 5, 6 and the workpiece 3 and any change in the dielectric constant epsilon can therefore be seen to result in a change in the frequency of the oscillators 9 and 10. Coaxial cables 11 and 12 are provided for feeding the output signals of the oscillators 9 and 10 to respective discriminators 13 and 14. In that connection the discriminators 13 and 14 are of such a design that they do not produce a d.c. voltage signal if the oscillators 9 and 10 oscillate at their respective reference or desired frequency. If a positive variation in frequency occurs, then a positive voltage value occurs at each output signal, while in the event of a negative change in frequency, a negative signal is produced. Connected to the output of the oscillator 14 is an inverting circuit 15 which converts the positive output signals of the discriminator 14 into negative signals and the negative output signals into positive signals. The amplification factor of the inverter circuit 15 may also be adjusted in order to balance the overall arrangement.

Figure 6:
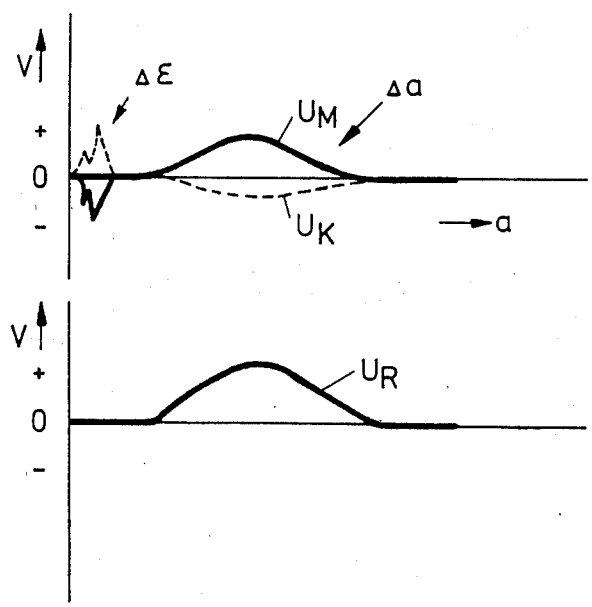
FIG. 6 shows the signal configuration at selected points of the circuit shown in FIG. 1.

As both electrodes 5 and 6 are practically uniformly affected if the dielectric constant alters as a consequence of ionised gases or metal vapors, a resulting change in the frequency of the oscillators 9 and 10 produces respective signals $U_M$, at the output of the discriminator 13, and $U_K$ at the output of the inverting circuit 15, said signals each being of the same magnitude but of opposite polarities. As shown in diagrammatic form in FIG. 6, when that occurs the interference voltages which are shown at "$\Delta\epsilon$" compensate each other. Changes in the capacitance of the electrodes 5 and 6 due to fluctuations in the dielectric constant therefore do not result in output signals $U_R$ at the regulating amplifier 16.

As shown, The compensation electrode is further away from the workpiece 3 than the measuring electrode 5. Fluctuations in spacing therefore have different effects on the capacitance values of the two electrodes 5 and 6 so that detuning of the oscillators 9 and 10, by changes in spacing, is also different. Correspondingly, although changes in the spacing also give rise at the output of the discriminator 13 and of the inverting circuit respectively, to signals of opposite polarity, they are however of different amplitudes. As shown in diagrammatic form in FIG. 6, therefore, a change $\Delta$ a results, at the output of the amplifier 16, in a signal $U_R$ which can be evaluated in known manner, for the purposes of adjusting the spacing and/or for display purposes.

Figure 2:
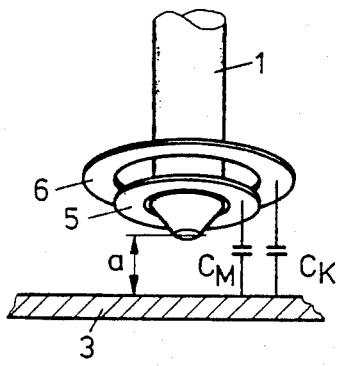
FIG. 2 is a detail view of electrodes in a modified embodiment.
Figure 3:
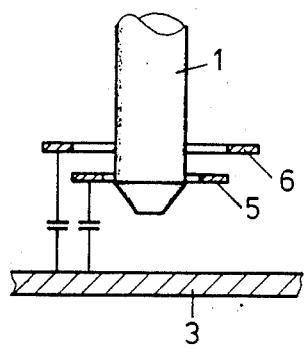
FIG. 3 is a view in longitudinal section through the arrangement shown in FIG. 2.

While, as shown in FIG. 1, the electrodes 5 and 6 are arranged in a disc-like configuration beside the tool 1, FIGS. 2 and 3 show annular electrodes 5 and 6 which are more suitable for monitoring the spacing in the annular space around the tool 1, than the laterally disposed electrodes 5 and 6 shown in FIG. 1. In that construction, as in the case of the embodiment shown in FIG. 1, the compensation electrode is further away from the workpiece 3 than the measuring electrode 5. In addition it projects laterally beyond the measuring electrode 5 in such a way that the latter does not influence the capacitance relative to the workpiece 3.

Figure 4:
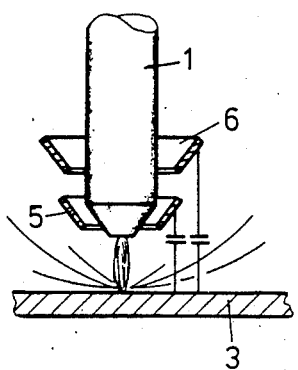
FIG. 4 shows a modified electrode arrangement.

The electrodes 5 and 6 shown in FIG. 4 are of a similar design to the annular electrodes shown in FIGS. 2 and 3. In order, however, that metal particles, gas vapors and the like which spray away from the workpiece 3 can escape quickly and in order to prevent contamination of the electrode surface, the electrodes as shown in FIG. 4 are inclined at an angle of about 45° with respect to the axis of tool 1. With the downwardly directed faces, the electrodes 5 and 6 which are of a conical configuration in the above-indicated manner afford only a relatively slight resistance to the particles which spray away from the workpiece 3 on an inclined path.

Figure 5:
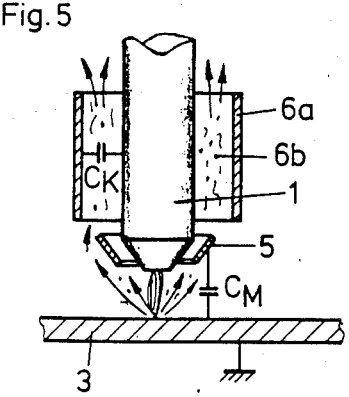
FIG. 5 shows an embodiment with a further modified compensation electrode.

FIG. 5 shows an embodiment in which the measuring electrode 5 corresponds to the arrangement shown in FIG. 4 whereas the compensation electrode 6a is disposed in the form of a concentric tube around the tool 1 and is held by insulating elements (not shown). In that arrangement the tool 1 is connected to earth in the same manner as the workpiece 3. By virtue of that arrangement the compensation capacitance $C_K$ is formed between the tool 1 and the compensation electrode 6a but the measuring capacitance $C_M$ is formed between the measuring electrode 5 and the workpiece 3. If, however, in the course of operation ionised gases and metal vapors rise up from the workpiece 3, they can pass into the annular space 6b between the tubular compensation electrode 6a and the tool 1, thereby producing a change in the capacitance value $C_K$ in the same fashion as a change in the value of the capacitance $C_M$.

Figure 7:
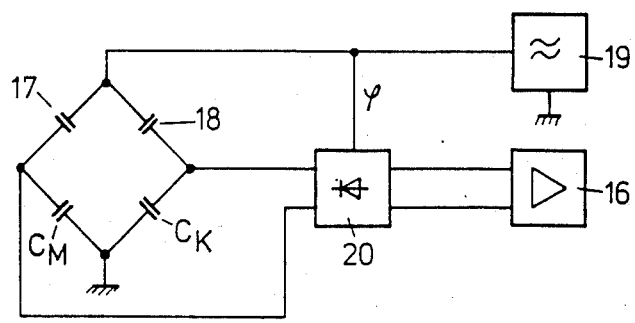
FIG. 7 shows a modified embodiment of a measuring arrangement with a capacitive bridge circuit.

FIG. 7 shows a block circuit diagram in which the measuring capacitance $C_M$ and the compensation capacitance $C_K$ are arranged in a bridge circuit, with the capacitors 17 and 18. In that construction the capacitances $C_M$ and $C_K$ may be formed by any alternative forms of the electrodes 5 and 6 (FIGS. 1-5). As shown in FIG. 7, the bridge circuit is fed with a.c. voltage signals by an oscillator 19. Disposed at the output side are a rectifier arrangement 20 and a regulating amplifier 16. If in the course of operation a change in the dielectric constant occurs, the measuring capacitance $C_M$ and the compensation capacitance $C_K$ are altered in the same fashion. No signal occurs at the output of the bridge circuit or the input of the rectifier arrangement 20 for the reason that the two arms 17 and $C_M$ and 18 and $C_K$ of the bridge remain balanced. If in contrast a change in the spacing a occurs, the measuring capacitance $C_M$ is altered to a greater degree than the compensation capacitance $C_K$, the bridge is no longer in a condition of balance and an input signal occurs at the input of the rectifier arrangement 20, the input signal being passed to the regulating amplifier 16. The mode of operation of the measuring arrangement shown in FIG. 7 is therefore similar to that of the arrangement shown in FIG. 1. The expenditure on components is somewhat lower. On the other hand in certain situations of use there may be a higher degree of sensitivity in relation to interference voltages because relatively small voltage signals must be transmitted from the bridge arrangement to the amplifier 16 while in the arrangement shown in FIG. 1 the information content (that is to say changes in the spacing a) is represented by the frequency of the oscillators 9 and 10 so that any interference voltages that may be induced into the coaxial cable 11 do not give rise to any error.

Figure 8:
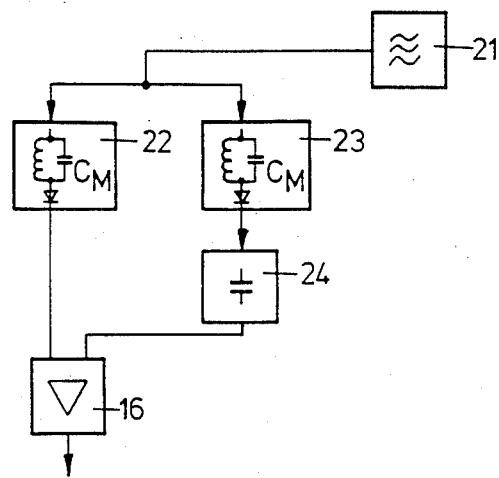
FIG. 8 shows a further modified embodiment of a measuring arrangement according to the invention having two band pass filters and a differentiating member.

FIG. 8 shows an embodiment in which two band pass filters 22 and 23 are fed by an oscillator 21. As shown in diagrammatic fashion, the measuring capacitance $C_M$ of the measuring electrode 5 (FIGS. 1 to 5) is provided as a frequency-influencing component of the band pass filter 22. On the other hand the compensation capacitance $C_K$ of the compensation electrode 6 (FIGS. 1 to 5) is provided as a frequency-determining component in the band pass filter 23. In that arrangement the two band pass filters 22 and 23 are so designed that, with the same changes in frequency of the capacitances $C_M$ and $C_K$ respectively, they produce output signals of the same amplitude but opposite polarities. The output signals may be compensated in a correspondingly similar fashion as that described hereinbefore in relation to the embodiment shown in FIG. 1 and in conjunction with FIG. 6. Unlike the general circuit arrangement shown in FIG. 1, a differentiating member 24 is provided between the amplifier 16 and the band pass filter 23. More particularly, it has been found in practice that fluctuations in dielectric constant frequently occur at a relatively high frequency of 5 to 20 Hertz, while changes in spacing occur substantially more slowly. That can be seen for example from FIG. 6. The differentiating member 24 is such that rapid fluctuations in signal, which result from a change in the dielectric constant, are passed through and applied to the input of the amplifier 16 whereas slow fluctuations which are due to changes in spacing are blocked. The negative feedback effect for the suppression of interference signals due to a change in the dielectric constant therefore occurs only in respect of signals wich actually result from such changes while other signals which show a change in spacing can be amplified without negative feedback in the amplifier 16.

Figure 9:
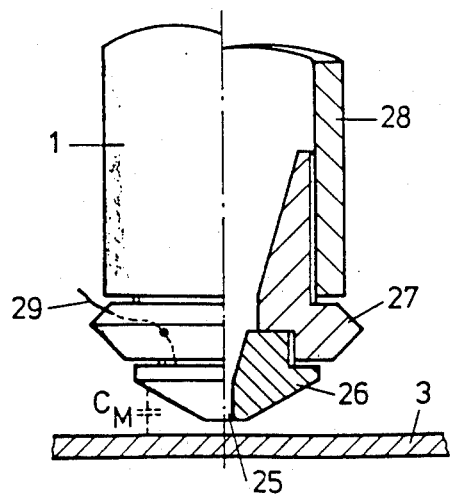
FIG. 9 shows a measuring electrode which is integrated into a working tool.

FIG. 9 shows a working tool 1 which uses a laser beam (not shown) in known fashion for cutting a workpiece 3. In the tool 1, the laser beam is directed through a bore 25 in a terminal member 26 onto the workpiece 3. The terminal member 26 is fixed in an isolated condition by means of a ceramic ring 27 to a tubular casing 28. A supply line 29 is taken through the ceramic member 27. The terminal member 26 consists of copper and, by virtue of the insulated arrangement, forms the measuring capacitance $C_M$, in conjunction with the workpiece 3. The compensation electrode 6 (not shown) is arranged in a similar fashion to the embodiment shown in FIG. 4, concentrically around the ceramic ring 27, at a larger spacing relative to the workpiece 3 than the terminal member 26.

I claim:

1. A measuring arrangement for measuring the spacing between a metal workpiece and a thermal tool when working on the workpiece, the arrangement comprising a thermal tool adustably mounted for working on a metal workpiece when in use, a capacitive measuring electrode fixed to said tool so as to leave a space between itself and said workpiece in a region in which heat is developed by said tool when in use, a compensation capacitive electrode fixed to said tool so as to leave a space between itself and said workpiece in a region in which heat is developed by said tool when in use, an atmosphere providing a common dielectric between said capacitive measuring electrode and said compensation capacitive electrode on the one hand and said workpiece on the other hand, said compensation capacitive electrode being positioned to produce a different spacing-dependent capacitance with respect to said workpiece from that of said capacitive measuring electrode, a measuring electric circuit including said measuring electrode for producing signals related to said spacing-dependent capacitance of said capacitive measuring electrode, a compensating electric circuit including said compensation electrode for producing signals related to said spacing-dependent capacitance of said compensation capacitive electrode, and means for receiving said signals from said measuring and said compensating circuits and combining them to produce an output dependent substantially only on the positions of said capacitive electrodes.

2. A measuring arrangement according to claim 1, in which said measuring electric circuit comprises an LC-circuit with said measuring electrode as a frequency-influencing member and means for converting changes in frequency into d.c. measuring signals, and in which said compensating electric circuit comprises an LC-circuit with said compensation electrode as a frequency-influencing member and means for converting changes in frequency into d.c. compensation signals, and an inverting circuit for said compensation signals.

3. A measuring arrangement according to claim 2, in which each one of said measuring electric circuit and said compensating electric circuit comprises an individual oscillator with the associated one of said LC-circuits as a frequency-determining component therefor.

4. A measuring arrangement according to claim 2, in which each said means for converting changes in frequency into d.c. signals comprises a discriminator.

5. A measuring arrangement according to claim 1, in which said measuring electric circuit and said compensating electric circuit respectively include mutually oppositely disposed arms of a bridge circuit with said measuring electrode in the measuring electric circuit arm and said compensation electrode in the compensating electric circuit arm.

6. A measuring arrangement according to claim 1, in which said means for receiving said signals comprises a regulating amplifier for control of the arrangement.

7. A measuring arrangement according to claim 1, in which said compensating electric circuit includes a differentiating member for filtering disturbance signals out of said signals produced by said compensating electric circuit.

8. A measuring arrangement according to claim 1, in which said measuring electrode and said compensation electrodes are each formed to surround said tool in an annular configuration.

9. A measuring arrangement according to claim 8, in which the outside diameter of said compensation electrode is larger than the outside diameter of said measuring electrode.

10. A measuring arrangement according to claim 8, in which said compensation electrode is in the form of a cylinder which surrounds said tool and defines an annular space between said compensation electrode and said tool which is at least partially open at the end of said cylinder closest to an operational end of said tool adjacent said workpiece, the arrangement further including means for connecting said tool to earth.

11. A measuring arrangement according to claim 8, in which at least one of said measuring electrode and compensation electrode is a frustoconical disc tapered inwards towards an operational end of said tool adjacent said workpiece.

12. A measuring arrangement according to claim 8, in which said tool is formed to provide a vertical axis thereof passing through an operational end of said tool adjacent said workpiece and at least one of said measuring electrode and compensation electrode is a frustoconical disc centered on said axis and tapered inwards in the direction of said operational end at an angle between 75° and 45° with respect to said axis.

* * * * *